United States Patent
Shao et al.

(10) Patent No.: US 8,385,362 B2
(45) Date of Patent: Feb. 26, 2013

(54) METHOD AND SYSTEM FOR CONTENTION-BASED MEDIUM ACCESS SCHEMES FOR DIRECTIONAL WIRELESS TRANSMISSION WITH ASYMMETRIC ANTENNA SYSTEM (AAS) IN WIRELESS COMMUNICATION SYSTEMS

(75) Inventors: Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 397 days.

(21) Appl. No.: 12/628,792

(22) Filed: Dec. 1, 2009

(65) Prior Publication Data

US 2010/0177719 A1  Jul. 15, 2010

Related U.S. Application Data

(60) Provisional application No. 61/143,635, filed on Jan. 9, 2009.

(51) Int. Cl.
*H04L 12/413* (2006.01)
*H04J 3/16* (2006.01)

(52) U.S. Cl. .......................... 370/445; 370/465

(58) Field of Classification Search .................. None
See application file for complete search history.

(56) References Cited

U.S. PATENT DOCUMENTS

| | | | |
|---|---|---|---|
| 5,596,333 A | 1/1997 | Bruckert | |
| 5,924,020 A | 7/1999 | Forssen et al. | |
| 6,414,955 B1 | 7/2002 | Clare et al. | |
| 6,954,449 B2 | 10/2005 | Cain et al. | |
| 6,985,498 B2 | 1/2006 | Laroia et al. | |
| 7,027,409 B2 | 4/2006 | Cain | |
| 7,043,274 B2 | 5/2006 | Cuffaro | |
| 7,085,541 B2 | 8/2006 | Redi et al. | |
| 7,272,126 B2 | 9/2007 | Soltanian et al. | |
| 7,304,972 B2 | 12/2007 | Cain et al. | |
| 7,333,458 B2 | 2/2008 | Cain | |
| 7,356,010 B2 | 4/2008 | He et al. | |
| 7,400,899 B2 | 7/2008 | Shin et al. | |
| 7,420,944 B2 | 9/2008 | Norris et al. | |
| 7,453,832 B2 | 11/2008 | Steer et al. | |
| 7,471,667 B2 | 12/2008 | Hirsch et al. | |
| 7,515,577 B2 | 4/2009 | Pandey et al. | |
| 7,551,135 B2 * | 6/2009 | Uno et al. ..................... 342/367 |
| 7,630,343 B2 | 12/2009 | Zhu et al. | |

(Continued)

OTHER PUBLICATIONS

IEEE Computer Society, "IEEE P802.15.3c/D02 Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension", IEEE, 2008, pp. i-192, New York, United States.

(Continued)

*Primary Examiner* — Nittaya Juntima
(74) *Attorney, Agent, or Firm* — Kenneth L. Sherman, Esq.; Michael Zarrabian, Esq.; Sherman & Zarrabian LLP (57) ABSTRACT

A method and system for wireless communication in an asymmetric antenna system (AAS) communication system is provided. A wireless station performs carrier sensing by sensing a wireless communication channel for ongoing communications in one or more directions. Upon detecting that the wireless communication channel is idle, the station transmits a frame preamble on the channel to a receiving wireless station in more than one transmit direction, and transmits a frame payload on the channel to the receiving wireless station in one transmit direction.

25 Claims, 9 Drawing Sheets

U.S. PATENT DOCUMENTS

| | | | |
|---|---|---|---|
| 7,664,054 | B2 | 2/2010 | Adya et al. |
| 7,729,321 | B2 | 6/2010 | Liu |
| 7,783,258 | B2 | 8/2010 | Bevan et al. |
| 7,826,431 | B2 * | 11/2010 | Cave et al. .................... 370/338 |
| 2002/0044549 | A1 | 4/2002 | Johansson et al. |
| 2002/0183095 | A1 | 12/2002 | Aoyama et al. |
| 2004/0141511 | A1 | 7/2004 | Rune et al. |
| 2005/0213554 | A1 * | 9/2005 | Ginzburg et al. ............. 370/349 |
| 2006/0050728 | A1 | 3/2006 | Sung et al. |
| 2006/0067280 | A1 | 3/2006 | Howard et al. |
| 2006/0209876 | A1 | 9/2006 | Liu et al. |
| 2006/0227740 | A1 | 10/2006 | McLaughlin et al. |
| 2006/0240780 | A1 * | 10/2006 | Zhu et al. ..................... 455/63.4 |
| 2006/0268800 | A1 | 11/2006 | Sugaya et al. |
| 2007/0115817 | A1 | 5/2007 | Gupta et al. |
| 2007/0287384 | A1 * | 12/2007 | Sadri et al. ................... 455/63.4 |
| 2007/0297365 | A1 | 12/2007 | Li et al. |
| 2008/0026797 | A1 | 1/2008 | Nanda et al. |
| 2008/0112375 | A1 | 5/2008 | Bennett |
| 2009/0016285 | A1 | 1/2009 | Li et al. |
| 2009/0046653 | A1 | 2/2009 | Singh et al. |
| 2009/0052389 | A1 | 2/2009 | Qin et al. |
| 2009/0109938 | A1 * | 4/2009 | Singh et al. ................... 370/337 |
| 2009/0125792 | A1 * | 5/2009 | Lakkis ........................... 714/783 |
| 2009/0323611 | A1 | 12/2009 | Singh et al. |
| 2010/0014489 | A1 | 1/2010 | Qin et al. |
| 2010/0091919 | A1 | 4/2010 | Xu et al. |
| 2010/0110981 | A1 | 5/2010 | Shao et al. |
| 2010/0111006 | A1 | 5/2010 | Zhai et al. |
| 2010/0118835 | A1 * | 5/2010 | Lakkis et al. ................. 370/336 |
| 2010/0142445 | A1 | 6/2010 | Schlicht et al. |
| 2010/0142460 | A1 | 6/2010 | Zhai et al. |
| 2010/0172296 | A1 * | 7/2010 | Singh et al. ................... 370/328 |
| 2011/0064072 | A1 | 3/2011 | Wang et al. |

OTHER PUBLICATIONS

International Preliminary Report on Patentability dated Feb. 24, 2010 for International Application No. PCT/KR2008/004793, filed Aug. 19, 2008, pp. 1-5, Geneva, Switzerland.

IEEE, "IEEE Wireless LAN Edition, A Compilation Based on IEEE Std 802.11™-1999 (R2003) and Its Amendments", IEEE, 2003, pp. i-678, New York, United States.

Harada, H. et al., "Unified and Flexible Millimeter Wave WPAN Systems Supported by Common Mode (IEEE 802.15-07-0761-00-003c)", IEEE, Jul. 9, 2007, pp. 1-46, United States.

IEEE Computer Society, "IEEE Std 802.15.3™-2003 IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)", IEEE, Sep. 29, 2003, pp. i-315, New York, United States.

International Search Report dated Jan. 9, 2009 for International Application No. PCT/KR2008/004793, filed Aug. 19, 2008, pp. 1-2, Seo-gu, Daejeon, Republic of Korea.

Harada, H. et al., "Unified and Flexible Millimeter Wave WPAN Systems Supported by Common Mode (IEEE 802.15-07-0761-10-003c)", IEEE, Sep. 18, 2007, pp. 1-62, United States.

Lakkis, I. et al., "IEEE P802.15 Wireless Personal Area Networks, TG3c Call for Proposals, Chapter 2: Superframe Structure (15-08-0355-00-003)" IEEE, May 14, 2008, pp. 37-43, United States.

Sadri, A.S. et al., "60 GHz WPAN Framework and Gaps of merged proposals (IEEE 802.15-924)", Nov. 14. 2007, pp. 1-19, IEEE, United States.

Harada, H. et al., "Merged Proposal: New PHY Layer Enhancement of MAC for mmWave System Proposal (IEEE 802.15-07-0934-01-003c)", Nov. 13, 2007, pp. 1-89, IEEE, United States.

U.S. Notice of Allowance for U.S. Appl. No. 12/188,158 mailed Mar. 2, 2012.

U.S. Non-Final Office Action for U.S. Appl. No. 12/541,096 mailed Feb. 14, 2012.

U.S. Final Office Action for U.S. Appl. No. 12/188,534 mailed Jun. 1, 2012.

U.S. Final Office Action for U.S. Appl. No. 12/541,096 mailed Jul. 18, 2012.

U.S. Non-Final Office Action for U.S. Appl. No. 12/189,534 mailed Sep. 5, 2012.

U.S. Non-Final Office Action for U.S. Appl. No. 12/541,096 mailed Oct. 10, 2012.

* cited by examiner

METHOD AND SYSTEM FOR CONTENTION-BASED MEDIUM ACCESS SCHEMES FOR DIRECTIONAL WIRELESS TRANSMISSION WITH ASYMMETRIC ANTENNA SYSTEM (AAS) IN WIRELESS COMMUNICATION SYSTEMS

RELATED APPLICATION

This application claims priority from U.S. Provisional Patent Application Ser. No. 61/143,635 filed on Jan. 9, 2009, incorporated herein by reference.

FIELD OF THE INVENTION

The present invention relates in general to wireless communication, and in particular, to directional wireless communication systems.

BACKGROUND OF THE INVENTION

In many wireless communication systems, a frame structure is used for data transmission between wireless stations such as a transmitter and a receiver. For example, the IEEE 802.11 standard uses a frame structure in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header thereto to construct a PHY Protocol Data Unit (PPDU). The PHY header includes parameters for determining a transmission scheme including a coding/modulation scheme. Before transmission as a packet from a transmitter to a receiver, a preamble is attached to the PPDU, wherein the preamble can include channel estimation and synchronization information.

Data applications such as Internet web surfing and e-mail exchange usually require random wireless channel access with bursty traffic characteristics. Reserving a channel time allocation (CTA) in advance for these types of data applications may lead to low MAC layer efficiency. Conventional channel access methods such as carrier sensing multiple access/collision avoidance (CSMA/CA) and an optional mechanism of Request To Send/Clear To Send (RTS/CTS) at a Contention Access Period (CAP), are impractical due to the high interference and collision probability caused by asymmetric antenna system (AAS) and directional transmissions.

BRIEF SUMMARY OF THE INVENTION

A method and system for wireless communication in an asymmetric antenna system (AAS) communication system is provided. In one embodiment, a wireless station performs carrier sensing by sensing a wireless communication channel for ongoing communications in one or more directions. Upon detecting that the wireless communication channel is idle, the station transmits a frame preamble on the channel to a receiving wireless station in more than one transmit direction, and transmits a frame payload on the channel to the receiving wireless station in one transmit direction.

These and other features, aspects and advantages of the present invention will become understood with reference to the following description, appended claims and accompanying figures.

DESCRIPTION OF THE INVENTION

The present invention provides a method and system for contention-based communication medium access schemes for directional wireless transmission with an asymmetric antenna system (AAS) in wireless communication systems. Said communication medium may comprise a wireless communication channel such as a radio frequency (RF) channel.

Asymmetric antenna system (AAS) means that a wireless station uses different antenna systems for transmission and reception. A wireless station with only one set of antennas used for both wireless reception and transmission can still include an AAS if the transmission directions and reception directions are different due to different configuration settings.

One embodiment of the invention comprises an enhanced carrier sensing multiple access/collision avoidance (CSMA/CA) process with an optional Request To Send/Clear To Send (RTS/CTS) process, for reducing interference and collision probability while enabling spatial re-use to improve overall wireless communication throughput. This embodiment provides a contention-based wireless channel access method and a data transmission method which reduce interference and collision probability while enabling spatial re-use to improve overall wireless system throughput.

Expected transmit and receive directions for a pair of wireless stations as used herein mean selected directions in which each wireless station expects to communicate with the other wireless station over a wireless channel (based on prior antenna training and switching). Sensing covers both expected transmit and receive directions. Sensing in a minimum number of directions comprises sensing which covers the expected transmission and receive directions.

Accordingly, in a wireless communication system including wireless station devices (DEVs), before a sender station sends (i.e., wirelessly transmits) packets on a wireless channel in a particular transmit direction, the sender station first senses the wireless channel in a minimum number of receive directions which combined together can cover the transmit direction in addition to the expected receive direction.

Then, in one embodiment, the sender station transmits RTS or CTS in the minimum number of transmit directions which cover its expected receive direction in addition to the expected transmit direction. After RTS/CTS negotiation, the sender station transmits a preamble (or Preamble plus physical/Media Access Control (PHY/MAC) header) of a data packet in the same way as RTS/CTS in the minimum number of transmit directions which cover its expected receive direction in addition to the expected transmit direction. The remainder of the packet (i.e., the header and the payload (or payload only)), is transmitted in the expected transmit direction only.

In addition, if a packet being transmitted is long (implementation dependent, typically longer than the time to keep channel estimation and synchronization from preamble), the process further involves the sender station periodically inserting mid-ambles into the packet and transmitting the mid-ambles in the minimum number of transmit directions which cover its expected receive direction in addition to the expected transmit direction, in the same way as the preamble (or Preamble plus PHY/MAC header) or RTS/CTS. The process can be applied to not only AAS but also symmetrical antenna systems (SAS) and can be used for both Piconet Coordinator (PNC)⇆DEV and DEV⇆DEV communications.

Figure 1:
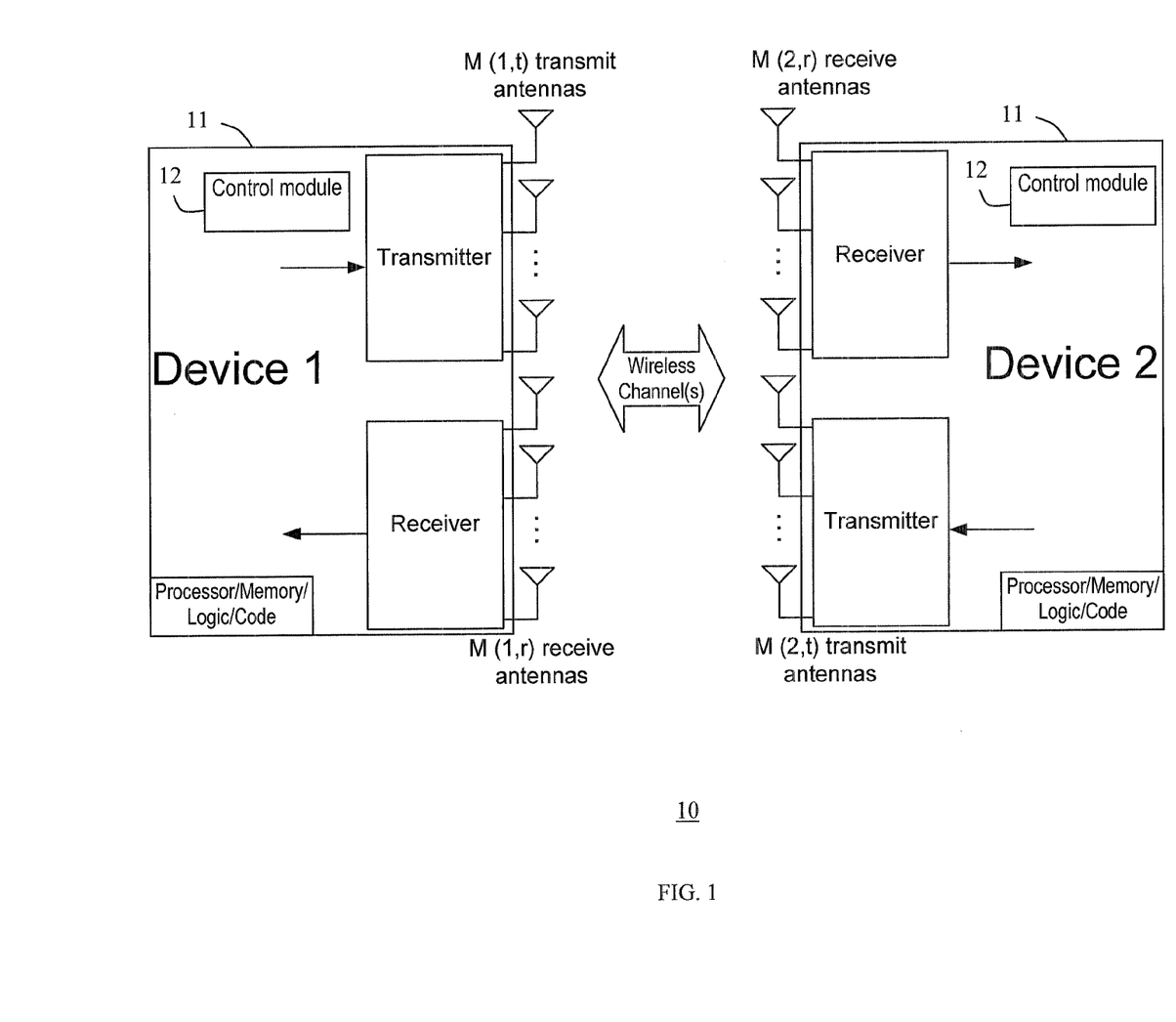
FIG. 1 shows a block diagram of a wireless asymmetric antenna system (AAS) communication system including wireless station devices, according to an embodiment of the invention.

An implementation of the invention is now described with reference to the drawings. FIG. 1 shows a functional block diagram of a transmitter antenna and receiver antenna system model in a wireless communication system 10 including wireless station devices 11 such as Device 1 (i.e., DEV1) and Device 2 (i.e., DEV2). As illustrated in FIG. 1, DEV1 includes M(1, t) transmit antennas and M(1, r) receive antennas, while DEV2 includes M(2, t) transmit antennas and M(2, r) receive antennas. A transmit/receive direction mapping/switching control module 12 implements embodiments of the invention described herein. The module 12 may be implemented in many ways, such as program instructions for execution by a processor, as software, microcode, as computer program product on computer readable media, as logic circuits, as application specific integrated circuits, as firmware, etc. Further, embodiments of the invention can take the form of an entirely hardware embodiment, an entirely software embodiment, or an embodiment containing both hardware and software elements.

In AAS, transmission and receiving can involve different number of antennas or other different configuration settings. For example, a wireless station device j may have I(j, t) transmission directions ("t" indicating transmission), wherein transmission configuration at kth direction is $Q_{k-1}^{(j,t)}$; and the wireless station device j may have I(j, r) receiving directions ("r" indicating receiving), wherein receiving configuration at kth direction is $Q_{k-1}^{(j,r)}$.

Figure 2:
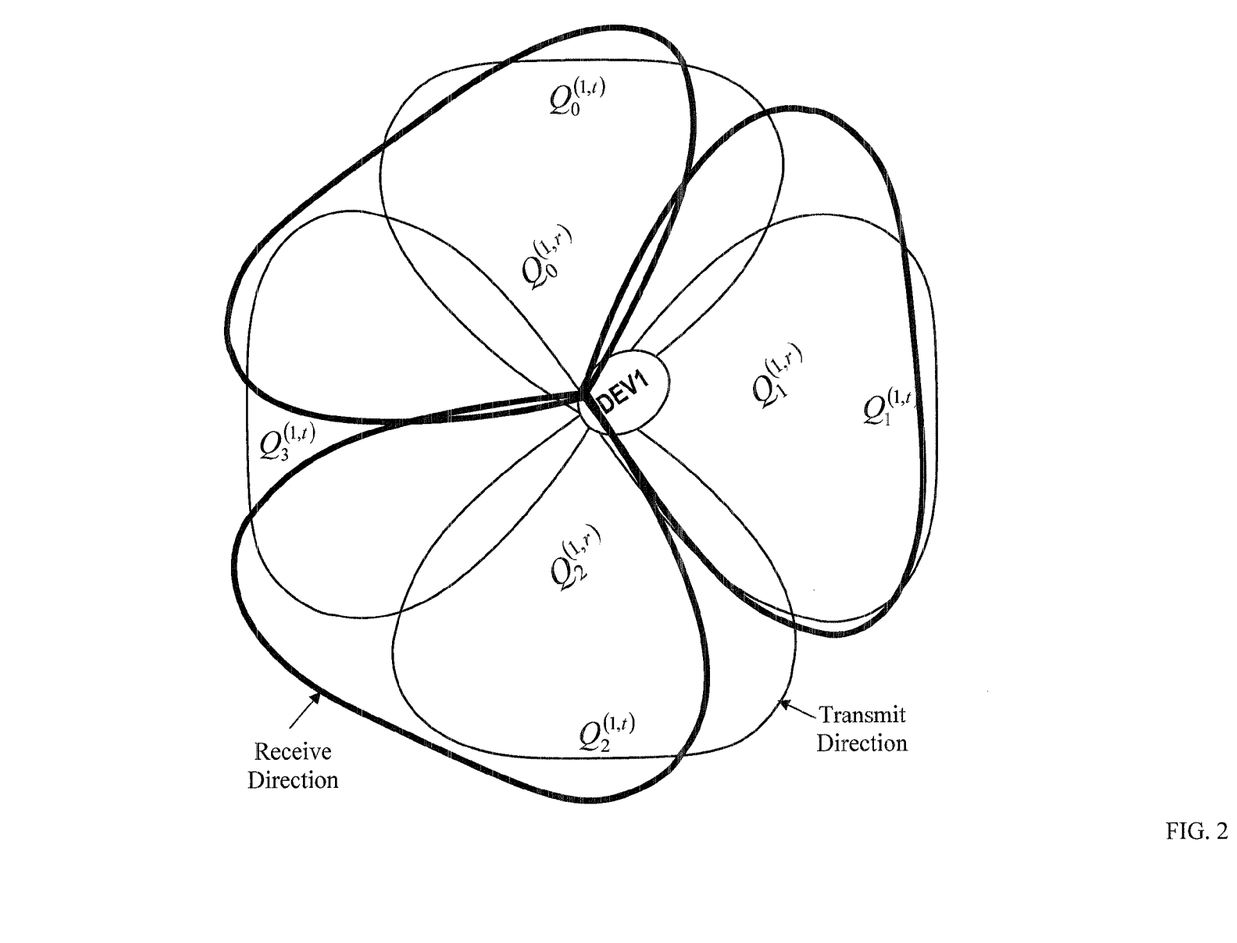
FIG. 2 shows an example of different number of transmit directions and receive directions for an AAS communication system, according to an embodiment of the invention.

FIG. 2 illustrates an example where different number of transmit directions and receive directions for AAS are shown for DEV1 (bold lobes indicate receive directions, and normal lobes indicate transmit directions). As illustrated by example in FIG. 2, DEV1 has four transmit directions (transmit lobes) and three receive directions (receive lobes). Transmit directions and receive directions may cover different spatial areas around DEV1. A special case of AAS is symmetric antenna system (SAS) in which the same antenna array, and also the same configuration setting, is used for transmitting (transmission) and receiving (reception), and for a symmetric wireless channel between two wireless station devices. For SAS, transmit directions and receive directions cover the same spatial areas.

In wireless networks operating at 2.4 GHz or 5 GHz, data is always transmitted omni-directionally. CSMA/CA provides contention-based communication medium access control since a wireless station in such networks can easily detect whether there are ongoing transmissions on a wireless channel within its transmission range.

However, for 60 GHz AAS with directional transmission, even if a wireless station detects that the wireless channel is free in its receive direction, interference with ongoing communications of other stations may still occur when that wireless station transmits a packet on the wireless channel in its transmit direction (such directional transmission may involve e.g., transmission using directional antennas, beamforming transmissions, etc.).

Figure 3:
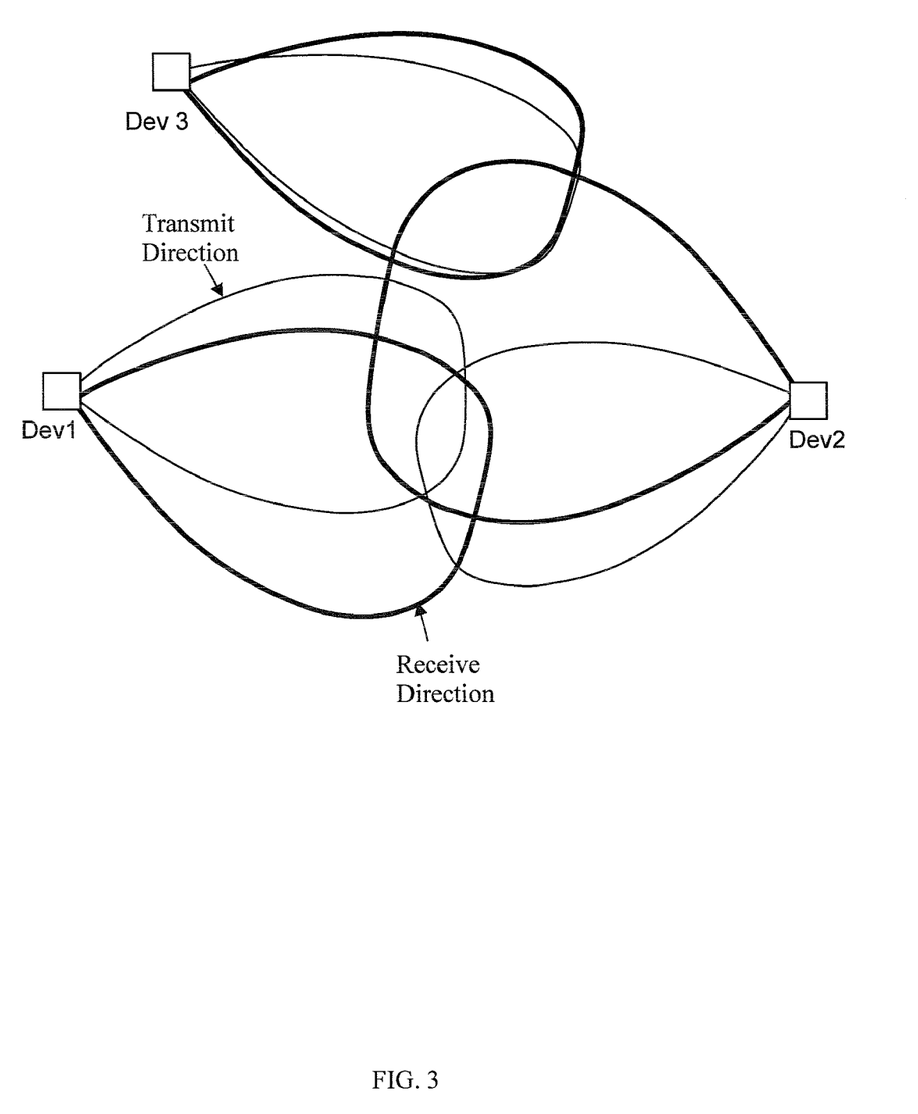
FIG. 3 illustrates an example of interference caused by AAS with directional transmissions in a conventional wireless system.

FIG. 3 illustrates an example of interference caused by AAS with directional transmissions in a conventional wireless system including three wireless station devices DEV1, DEV2, DEV3. When DEV1 wishes to communicate with DEV2, DEV1 first senses the wireless channel at its receive direction. If the channel is free in the receive direction, DEV1 starts to directionally transmit a packet at its transmit direction on the channel and DEV2 receives the packet at its receive direction. However, DEV3 cannot detect the packet transmitted by DEV1 at receiving direction of DEV3 and might transmit a packet to DEV2 which causes collisions at DEV2 with packets from DEV1. Conventional RTS/CTS mechanisms (i.e., DEV1 sends RTS at its transmit direction to DEV2, and DEV2 sends CTS at its transmit direction to DEV1) cannot solve the collision problem caused by DEV3 in an AAS system since the transmit direction and receive direction cover different areas for AAS.

Enhanced Carrier Sensing

According to an embodiment of the invention, an enhanced CSMA/CA and RTS/CTS process (i.e., enhanced carrier sensing) is provided to reduce/eliminate the interference problem caused by AAS while still allowing spatial re-use (i.e., proximate wireless stations perform simultaneous directional transmissions without interference with each other). Without loss of generality, in this embodiment, it is assumed that two wireless station devices have already trained their antennas and found the directions to each other using known antenna training techniques, before they use contention-based medium access control to exchange data on a wireless channel.

Enhanced carrier sensing according to the invention comprises channel sensing by a wireless station (device), covering the transmit direction to be used for a new transmission in addition to the expected receive direction. Before a sender wireless station transmits packets on the wireless channel in a particular transmit direction, the wireless station first senses the channel in a minimum number of receive directions which combined together can cover the transmit direction in addition to the expected receive direction at the wireless station. As shown by example in FIG. 2, if wireless station Device 1 (i.e., DEV1) desires to transmit a packet in a transmit direction $Q_3^{(1,t)}$ and receive packets in a receive direction $Q_2^{(1,r)}$, then DEV1 senses the wireless channel in the receive directions of $Q_0^{(1,r)}$ and $Q_2^{(1,r)}$. The switching time for sensing between different directions is implementation specific, for example, can be every 2 microseconds.

A wireless station may determine which receive directions can cover one transmit direction in different ways. An example is that during a Quasi-omni direction training stage, such as specified in sub-section 8.6.6 of the IEEE 802.15.3c specification draft and the beamforming antenna training stage such as specified in section 13 of the IEEE 802.15.3c specification, a device may determine the relationships between its transmit directions and receive directions.

Enhanced RTS/CTS

After determining which receive directions can cover one transmit direction, an enhanced RTS/CTS process according to an implementation of the invention overcomes interference and hidden node problems caused by AAS and directional transmissions. Accordingly, instead of sending out RTS/CTS in one particular transmit (TX) direction or in all transmit directions, a wireless station transmits the RTS or CTS in a minimum number of transmit directions which cover its expected receive (RX) direction in addition to the expected transmit direction.

For example, as shown in FIG. 2, if Device 1 (i.e., DEV1) desires to receive packets in the receive direction $Q_0^{(1,r)}$ and transmit packets in the transmit direction $Q_0^{(1,t)}$, then DEV1 sends RTS or CTS in the transmit directions of $Q_0^{(1,t)}$ and $Q_3^{(1,t)}$, which combined together can cover the receive direction $Q_0^{(1,r)}$. With this approach, the interference and hidden node problem are reduced/eliminated, while spatial re-use is maintained. The switching of RTS/CTS transmission between different directions at a wireless station is implementation specific, for example, can be symbol based or multiple symbol based.

Further, packet-based switching may be performed at a wireless station wherein the entire RTS/CTS is transmitted in one direction first before switching to another direction. However, the RTS is transmitted in the expected transmit direction as the last direction and the CTS is transmitted in the expected transmit direction as the first direction, in order to maintain a MAC protocol Short Inter-Frame Space (SIFS) period between RTS and CTS.

Figure 4:
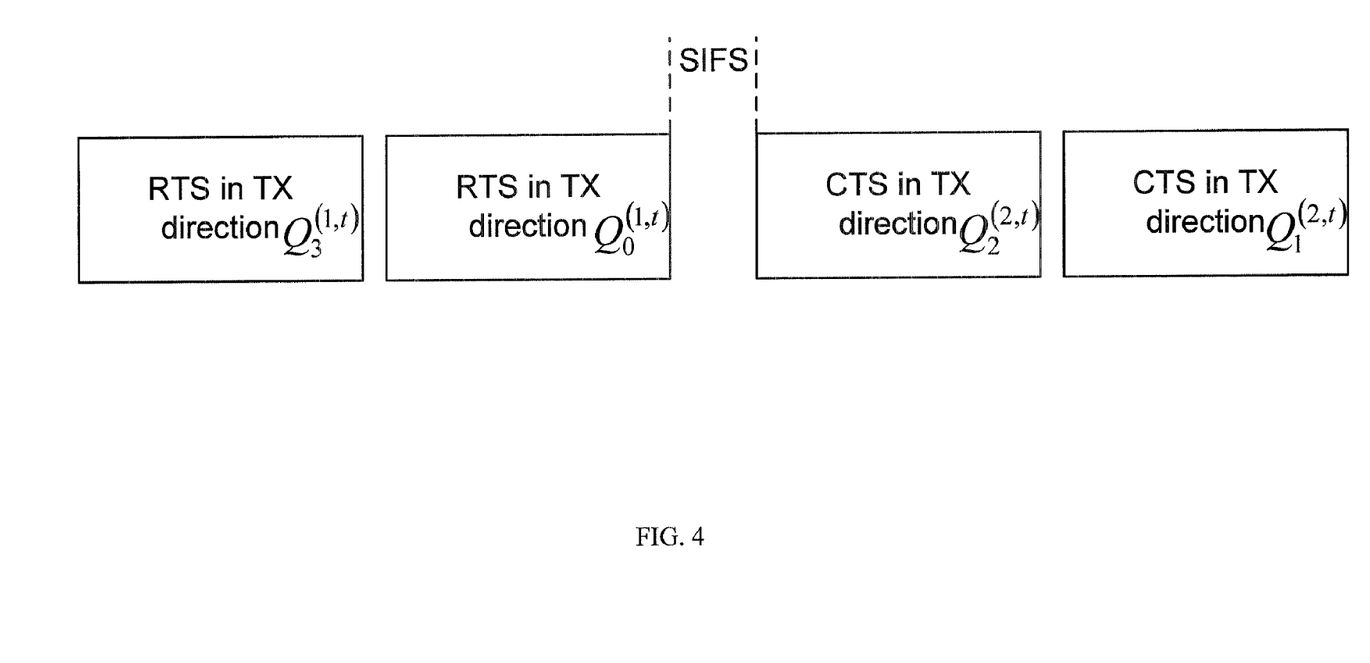
FIG. 4 shows an example of ordering of requests to send (RTS) and clear to send (CTS) frames in a number of transmit directions and receive directions in an AAS communication system, according to an embodiment of the invention.

Referring to the example scenario in FIG. 4, DEV1 wishes to transmit RTS in the transmit directions of $Q_0^{(1,t)}$ and $Q_3^{(1,t)}$, but its expected transmit direction for actual data is only $Q_0^{(1,t)}$.

Further, DEV2 wishes to reply with CTS in the transmit directions of $Q_1^{(2,t)}$ and $Q_2^{(2,t)}$ but its expected transmit direction for actual data is only $Q_2^{(2,t)}$. The RTS/CTS transmission at different directions is implemented as shown with ordering of RTS and CTS in different directions under packet based repetition, maintaining a SIFS period between RTS and CTS transmissions. DEV1 transmits RTS in transmit directions $Q_3^{(1,t)}$ and $Q_0^{(1,t)}$. After a SIFS period, DEV2 transmits responsive CTS in transmit directions $Q_2^{(2,t)}$ and $Q_1^{(2,t)}$.

In this example, the requirement for order of transmissions in RTS/CTS negotiations is that there is at least a SIFS period in between RTS transmission by DEV1 in the expected transmission direction $Q_0^{(1,t)}$ and CTS transmission by DEV2 in the expected transmission direction $Q_2^{(2,t)}$.

Enhanced Data Packet Transmission

Figure 5:
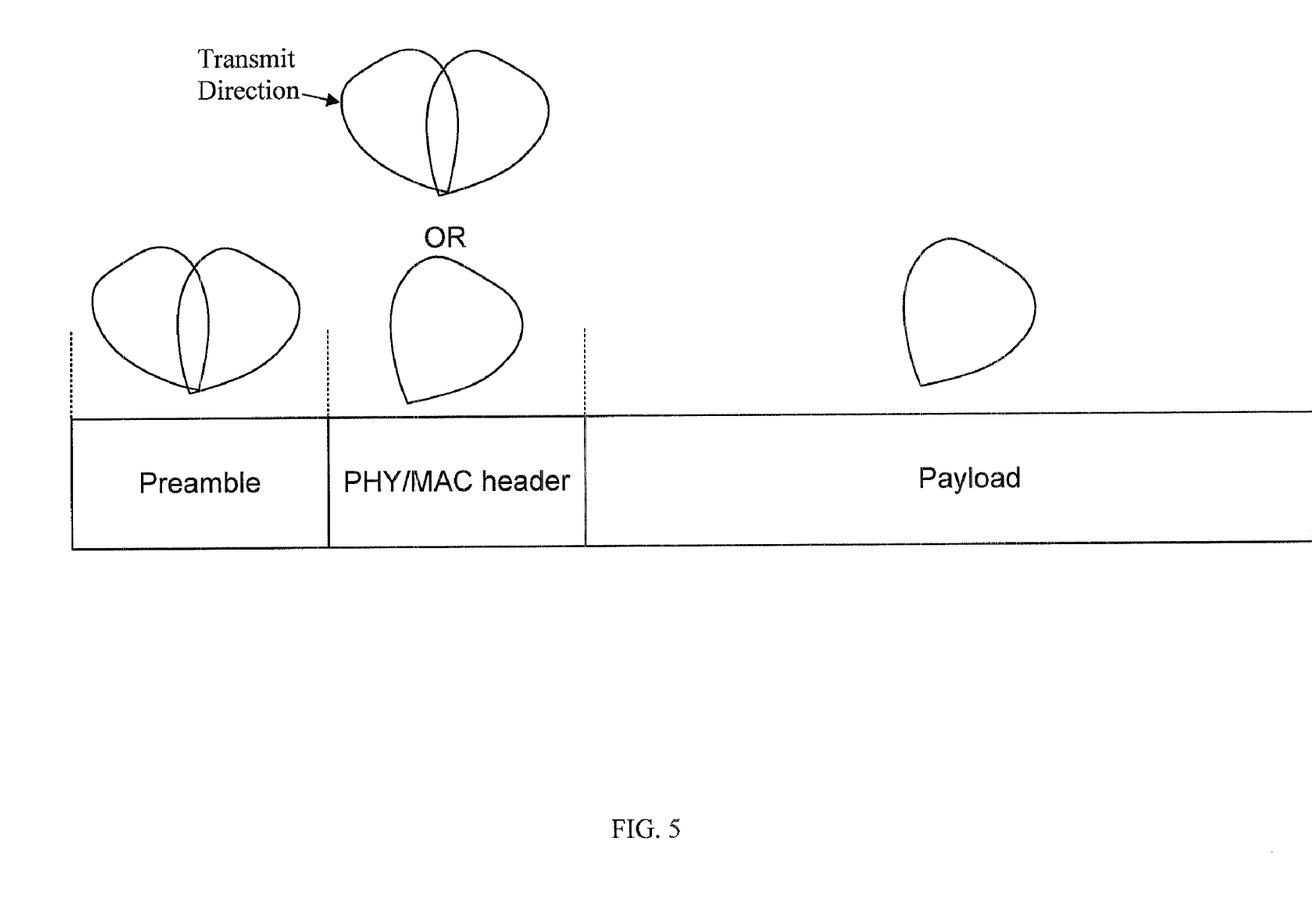
FIG. 5 shows an example of data packet transmission in an AAS communication system, according to an embodiment of the invention.

Further, according to the invention, an enhanced data packet transmission is implemented to prevent other types of collisions. After RTS/CTS negotiation between a transmitting wireless station and a receiving wireless station, during a reserved transmission opportunity (TXOP) when a data packet is being transmitted at a particular transmit direction from the transmitting station, it is still possible that a newly joining station or (a station waking up from a sleep state) interferes with the ongoing transmission by transmitting a packet after sensing channel idle in certain directions. As illustrated in FIG. 5, according to an embodiment of the invention, to reduce this type of interference or collision probability, the preamble (or Preamble plus PHY/MAC header) of a data packet is transmitted by a wireless station the same as RTS/CTS in the minimum number of transmit directions which cover its expected receive direction, in addition to the expected transmit direction. The remainder of the packet (i.e., header and the payload (or payload only)), is transmitted in the expected transmit direction only.

One special case is that the preamble (or Preamble plus PHY/MAC header) can be transmitted omni-directionally. The switching of transmission between different directions at a wireless station is implementation specific and can be, for example, symbol based or multiple symbol based. The remainder of the packet (i.e., header and the payload (or payload only)), is transmitted in the expected transmit direction only.

Figure 6:
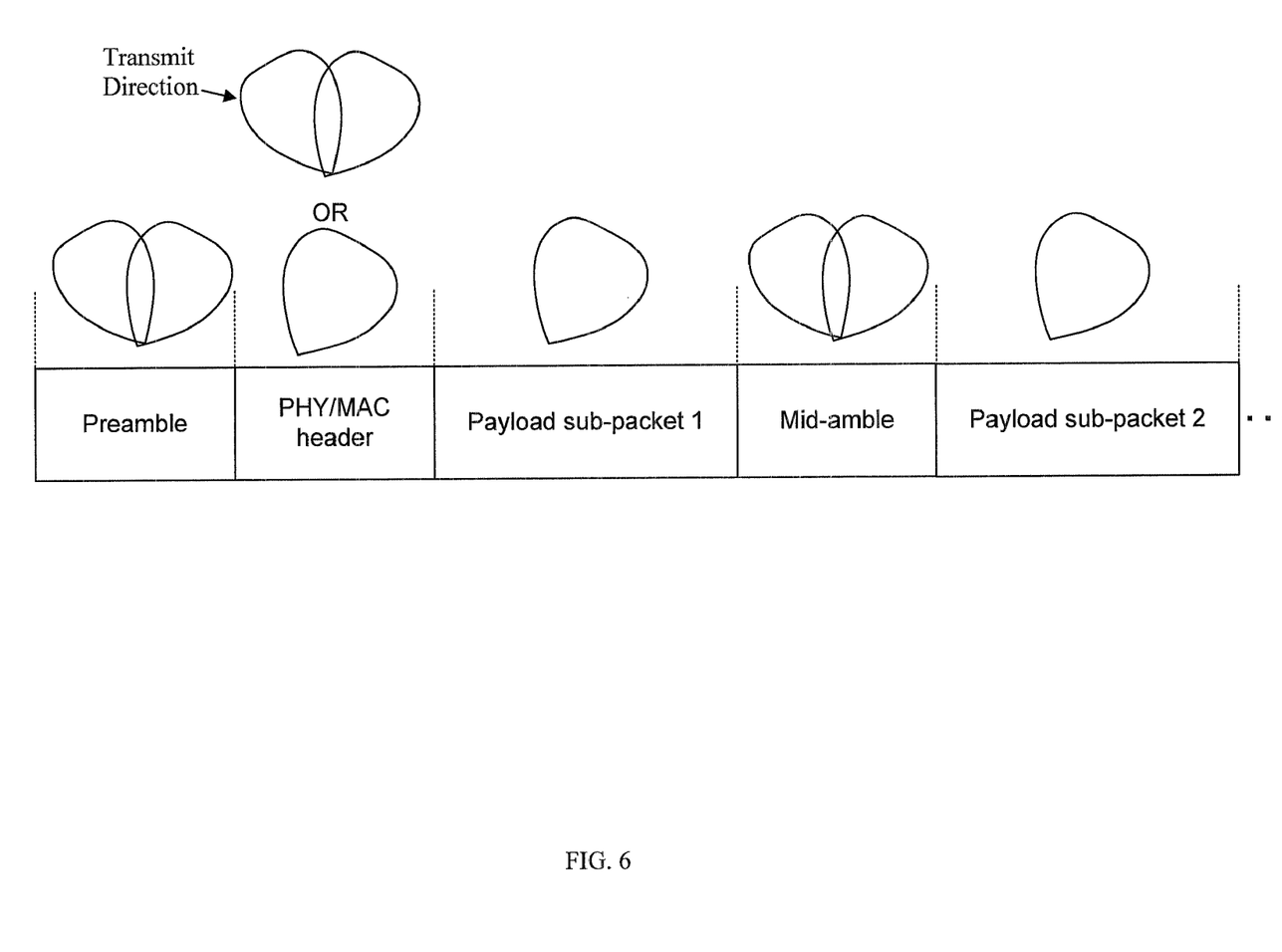
FIG. 6 shows another example of data packet transmission in an AAS communication system, according to an embodiment of the invention.

If a packet being communicated between two wireless stations is long, another wireless station which joins or wakes up after the preamble (or Preamble plus PHY/MAC header) of that long packet may still interfere with the ongoing packet communication. As illustrated in FIG. 6, according to an embodiment of the invention, to reduce this type of interference or collision probability, mid-ambles are inserted into the packet by a transmitting station and transmitted in a minimum number of transmit directions which cover the expected receive direction at that station, in addition to the expected transmit direction (similar to the preamble (or Preamble plus PHY/MAC header) or RTS/CTS). One special case is that the mid-ambles can be transmitted omni-directionally. The switching of transmission between different directions at the station is implementation specific and can be, for example, symbol based or multiple symbol based. The periodically inserted mid-ambles can also be used for beam-tracking purposes if phased array antennas are used.

Combinations

The enhanced carrier sensing process according to the invention, can be used alone to reduce interference and collision probability. In addition, the enhanced carrier sensing can be combined with enhanced data packet transmission according to the invention, to further reduce interference and collision probability. Further, enhanced carrier sensing can be combined with said enhanced RTS/CTS according to the invention, to further reduce interference and collision probability. Still further, enhanced carrier sensing and enhanced RTS/CTS can be combined to further reduce interference and collision probability.

Symmetrical Antenna System (SAS)

SAS is a special case for AAS. For SAS, since expected transmit direction and the receive direction are the same, carrier sensing only needs to be performed in the expected receive direction; RTS/CTS only need to be transmitted in the expected transmit direction; and the preamble (or Preamble plus PHY/MAC header) or mid-amble of data packets only need to be transmitted in the expected transmit direction, the same as data payload.

Process Implementations

Figure 7:
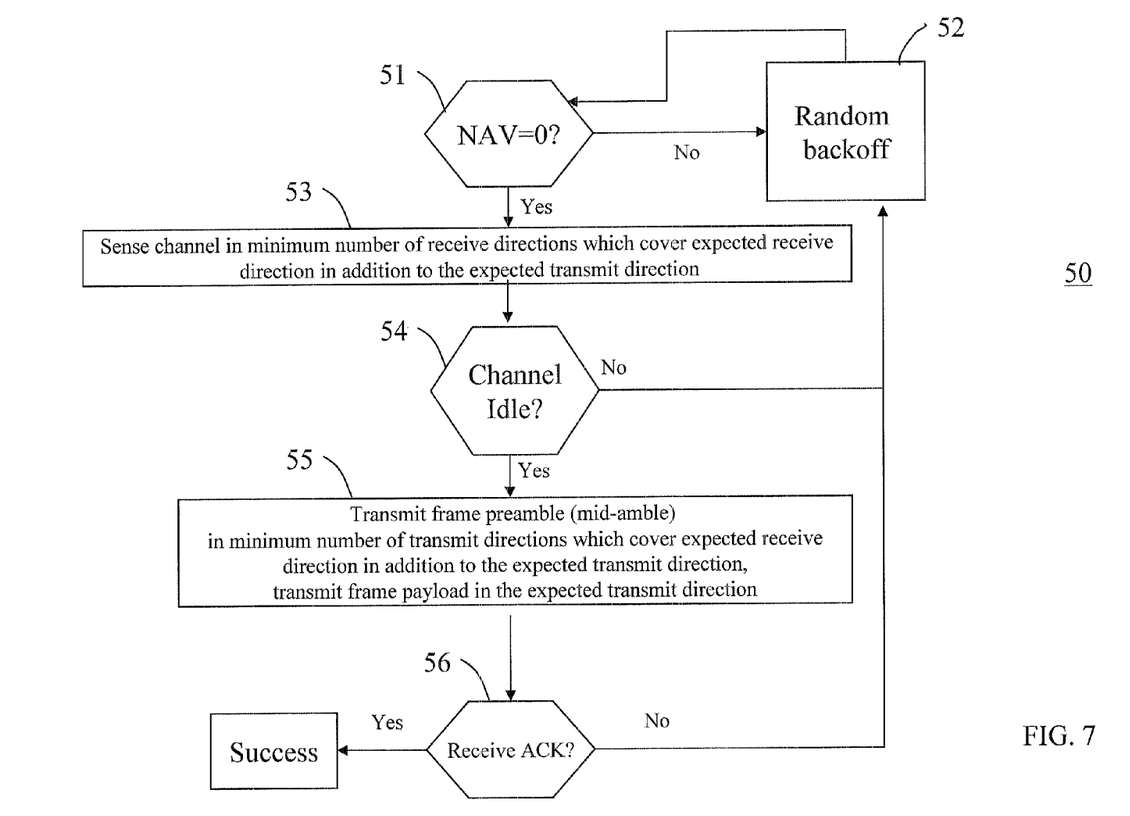
FIG. 7 shows a flowchart of enhanced carrier sensing multiple access/collision avoidance (CSMA/CA) carrier sensing process implemented by a wireless station in an AAS communication system, according to an embodiment of the invention.
Figure 8:
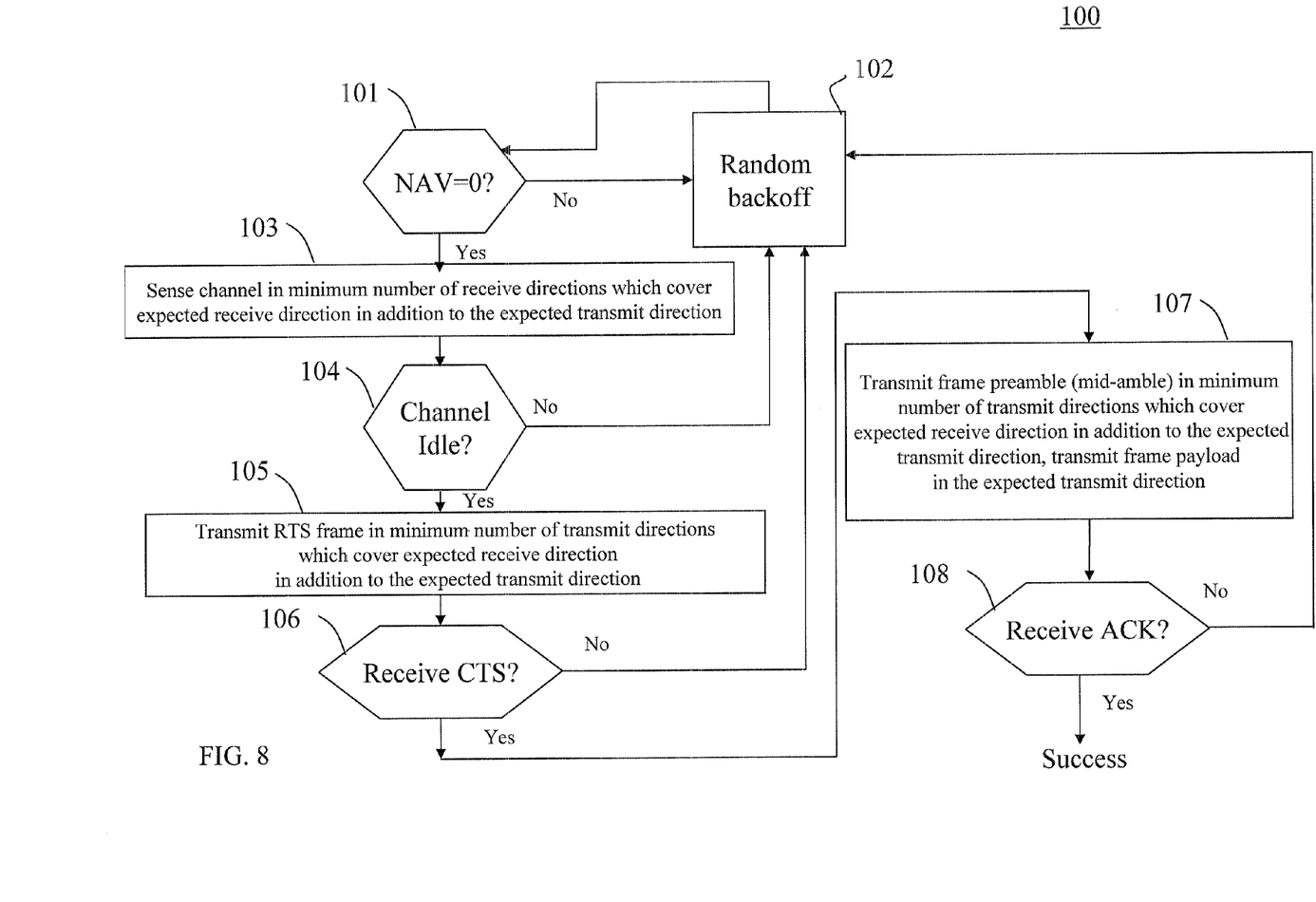
FIG. 8 shows a flowchart of an enhanced CSMA/CA with enhanced RTS/CTS process implemented by a wireless station in an AAS communication system, according to an embodiment of the invention.

A contention-based channel access method and data transmission process according to the invention reduces interference and collision probability while enabling spatial re-use to improve overall system throughput. FIGS. 7 and 8 show flowcharts of example implementations of the invention for IEEE 802.11 wireless communication systems. Specifically, FIG. 7 shows a flowchart of enhanced CSMA/CA carrier sensing process 50 implemented by a wireless station, according to an embodiment of the invention, comprising:

Block 51: Check that the network allocation vector (NAV) is zero before attempting to transmit an information frame on a wireless carrier channel. If not, proceed to block 52, else proceed to block 53.
Block 52: Back off from the transmission attempt for a time period, proceed to block 51.
Block 53: Sense the channel for ongoing communications in minimum number of receive directions which cover its expected receive direction in addition to the expected transmit direction.
Block 54: If the channel is idle, proceed to block 55, else proceed to block 52.
Block 55: Transmit frame preamble (mid-amble) in minimum number of transmit directions which cover its expected receive direction in addition to the expected transmit direction, transmit frame payload in the expected transmit direction.
Block 56: If acknowledgment (ACK) is received from a receiving station, then transmission is successful, else proceed to block 52.

FIG. 8 shows a flowchart of an enhanced CSMA/CA with enhanced RTS/CTS process 100 implemented by a wireless station, according to an embodiment of the invention, comprising:

Block 101: Check that the network allocation vector (NAV) is zero before attempting to transmit an information frame on a wireless carrier channel. If not, proceed to block 102, else proceed to block 103.
Block 102: Back off from the transmission attempt for a time period, proceed to block 101.
Block 103: Sense the channel for ongoing communications in minimum number of receive directions which cover its expected receive direction in addition to the expected transmit direction.
Block 104: If the channel is idle, proceed to block 105, else proceed to block 102.
Block 105: Transmit RTS frame in minimum number of transmit directions which cover its expected receive direction in addition to the expected transmit direction.
Block 106: If CTS is not received from a receiving station, then proceed to block 102, else proceed to block 107.
Block 107: Transmit frame preamble (mid-amble) in minimum number of transmit directions which cover its expected receive direction in addition to the expected transmit direction, transmit frame payload in the expected transmit direction.
Block 108: If acknowledgment (ACK) is received from the receiving station, then transmission is successful, else proceed to block 102.

Enhanced carrier sensing according to the invention provides that before a wireless station transmits packets on the channel in a particular transmit direction, it first senses the channel in a minimum number of receive directions which combined together can cover the transmit direction in addition to the expected receive direction. A station transmits the RTS or CTS in the minimum number of transmit directions which cover its expected receive direction in addition to the expected transmit direction. After RTS/CTS negotiation, the station transmits the preamble (or preamble plus PHY/MAC header) of a data packet as the same as RTS/CTS in the minimum number of transmit directions which cover its expected receive direction in addition to the expected transmit direction. The remainder of the packet, i.e., Header and the payload (or payload only), is transmitted in the expected transmit direction only.

If a packet being transmitted is long, the station periodically inserts mid-ambles into the packet and transmit the mid-ambles in the minimum number of transmit directions which cover the expected receive direction for a device in addition to the expected transmit direction, the same as the preamble (or Preamble plus PHY/MAC header) or RTS/CTS. The station can reduce RTS/CTS overhead since RTS/CTS overhead is transmitted at only necessary directions. Further, spatial re-use is enabled since RTS/CTS is transmitted only at necessary directions instead of all directions.

Figure 9:
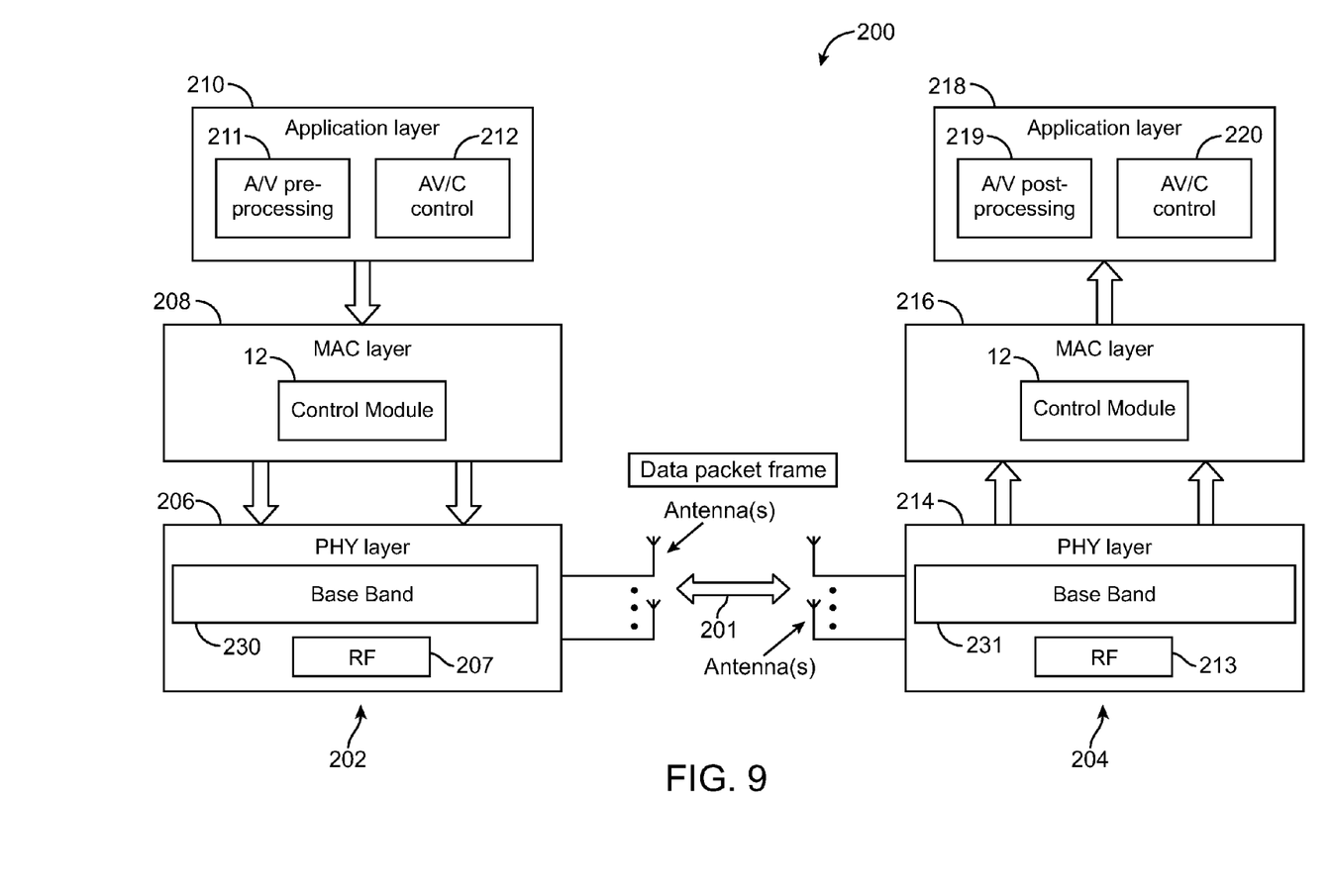
FIG. 9 shows a block diagram of a wireless AAS communication system including wireless station devices, according to an embodiment of the invention.

The invention provides a general wireless communication scheme which can be applied to directional communication between two wireless stations or between a station and a coordinator, in a wireless network or communication system. FIG. 9 shows a block diagram of an example AAS wireless communication system 200, implementing an embodiment of the present invention. The system 200 includes wireless stations such as a wireless station 202 and wireless station 204, for data communication, such as transmission of data, audio/video information over a wireless channel 201. The wireless devices in FIG. 1 are examples of such wireless stations.

The station 202 includes a PHY layer 206, a MAC layer 208 and an application layer 210. The PHY layer 206 includes a radio frequency (RF) communication module 207 which transmits/receives signals under control of a baseband process module 230. The baseband module 230 allows communicating control information and video information.

The application layer 210 includes an audio/visual (A/V) pre-processing module 211 for packetizing video streams, which are then converted to MAC packets by the MAC layer 208. The application layer 210 further includes an audio/visual controller (AV/C) control module 212 which sends stream transmission requests and control commands to access the channel for transmission of packets. An example data packet frame format transmitted between the transmitter station 202 and the receiver station 204 is as shown in FIG. 6.

The station 204 includes a PHY layer 214, a MAC layer 216 and an application layer 218. The PHY layer 214 includes an RF communication module 213 which transmits/receives signals under control of a base band process module 231. The application layer 218 includes an A/V post-processing module 219 for de-packetizing into streams the video information in the MAC packets, received by the MAC layer 216. The de-packetizing is reverse of the packetization. The application layer 218 further includes an AV/C control module 220 which handles stream control and channel access.

Directional transmissions such as beamforming transmissions are performed over the channel. The MAC/PHY layers perform antenna training and beaming switching control. An example application of the present invention in FIG. 9 is for millimeter Wave (mmWave) wireless networks, such as 60 GHz frequency band wireless networks. In one example, for each of stations 202, 204, the invention may be implemented in their respective MAC layers. Specifically, for implementation, the MAC layer controls the PHY layer to perform channel sensing at different directions, transmit RTS/CTS at different directions, and transmit a data packet at one or different directions, etc. A transmit/receive direction mapping/switching control module 12 (FIG. 1) is provided in the MAC layer of one or more wireless stations to implement the above steps such as in FIGS. 7-8.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

What is claimed is:

1. A method of wireless communication in an asymmetric antenna system (AAS) communication system, comprising:
   carrier sensing, by a wireless station sensing a wireless communication channel for ongoing communications in one or more directions, wherein carrier sensing further comprises sensing the wireless communication channel in a minimum number of receive directions for covering a transmit direction;
   upon detecting that the wireless communication channel is idle:
      transmitting a frame preamble on the channel to a receiving wireless station in more than one transmit direction; and
      transmitting a frame payload on the channel to the receiving wireless station in one transmit direction,
   wherein the minimum number of receive directions combined together cover the transmit direction in addition to an expected receive direction.

2. The method of claim 1 further comprising:
   detecting if an acknowledgment (ACK) is received from the receiving wireless station, indicating that the transmission was successful.

3. The method of claim 1 further comprising:
   upon detecting the channel is idle:
      transmitting a request to send (RTS) frame on the channel to the receiving wireless station in a minimum number of transmit directions which cover the expected receive direction in addition to an expected transmit direction.

4. The method of claim 3 further comprising:
   upon receiving a clear to send (CTS) frame from the receiving wireless station in response to the RTS frame, transmitting the frame preamble to the receiving wireless station in the minimum number of transmit directions which cover the expected receive direction in addition to the expected transmit direction; and
   transmitting the frame payload to the receiving wireless station in the expected transmit direction only.

5. The method of claim 4 further comprising maintaining a Short Inter-Frame Space period between transmission of an RTS frame and a CTS frame in a transmission direction.

6. The method of claim 1, wherein transmitting the frame preamble further comprises periodically transmitting a frame mid-amble in a minimum number of transmit directions which cover an expected receive direction in addition to an expected transmit direction.

7. A wireless station for asymmetric antenna system (AAS) communication, comprising:
   a transceiver that communicates over a wireless communication channel; and a control module that senses a wireless communication channel via the transceiver for ongoing communications in one or more directions, and upon detecting that the wireless communication channel is idle, transmits via the transceiver a frame preamble on the channel to a receiving wireless station in more than one transmit direction and transmits a frame payload on the channel to the receiving wireless station in one transmit direction, wherein the wireless channel is sensed in a minimum number of receive directions for covering a transmit direction, wherein the receive directions combined together cover the transmit direction in addition to an expected receive direction.

8. The wireless station of claim 7, wherein the control module is further configured for detecting if an acknowledgment (ACK) is received from the receiving wireless station, indicating that the transmission was successful.

9. The wireless station of claim 7, wherein the control module is further configured for, upon detecting the channel is idle, transmitting a request to send (RTS) frame on the channel to the receiving wireless station in a minimum number of transmit directions which cover the expected receive direction in addition to an expected transmit direction.

10. The wireless station of claim 9, wherein the control module is further configured for, upon receiving a clear to send (CTS) frame from the receiving wireless station in response to the RTS frame, transmitting the frame preamble to the receiving wireless station in the minimum number of transmit directions which cover the expected receive direction in addition to the expected transmit direction, and transmitting the frame payload to the receiving wireless station in the expected transmit direction only.

11. The wireless station of claim 10, wherein the control module is further configured for maintaining a Short Inter-Frame Space period between transmission of an RTS frame and a CTS frame in a transmission direction.

12. The wireless station of claim 7, wherein the control module is further configured for periodically transmitting a frame mid-amble in a minimum number of transmit directions which cover an expected receive direction in addition to an expected transmit direction.

13. A wireless asymmetric antenna system (AAS) communication system, comprising:
a transmitting wireless station and a receiving wireless station; and
the transmitting wireless station comprising a transceiver configured for wireless communication over a wireless communication channel, and a control module that senses a wireless communication channel via the transceiver for ongoing communications in one or more directions, and upon detecting that the wireless communication channel is idle, transmits via the transceiver a frame preamble on the channel to the receiving wireless station in more than one transmit direction and transmits a frame payload on the channel to the receiving wireless station in one transmit direction, wherein the wireless communication channel is sensed in a minimum number of receive directions for covering a transmit direction, wherein the minimum number of receive directions combined together cover the transmit direction in addition to an expected receive direction.

14. The communication system of claim 13, wherein the control module is further configured for detecting if an acknowledgment (ACK) is received from the receiving wireless station, indicating that the transmission was successful.

15. The communication system of claim 13, wherein the control module is further configured for, upon detecting the channel is idle, transmitting a request to send (RTS) frame on the channel to the receiving wireless station in a minimum number of transmit directions which cover the expected receive direction in addition to an expected transmit direction.

16. The communication system of claim 15, wherein the receiving wireless station further comprises a control module for transmitting a responsive clear to send (CTS) frame in a minimum number of transmit directions which cover its expected receive direction in addition to the expected transmit direction.

17. The communication system of claim 16, wherein the control module of the transmitting wireless station is further configured for, upon receiving a CTS frame from the receiving wireless station in response to the RTS frame, transmitting the frame preamble to the receiving wireless station in the minimum number of transmit directions which cover the expected receive direction in addition to the expected transmit direction, and transmitting the frame payload to the receiving wireless station in the expected transmit direction only.

18. The communication system of claim 17, wherein the control modules of the transmitting and receive wireless stations are further configured for maintaining a Short Inter-Frame Space period between transmission of an RTS frame and a CTS frame in a transmission direction.

19. The communication system of claim 13, wherein the control module of the transmitting wireless station is further configured for periodically transmitting a frame mid-amble in a minimum number of transmit directions which cover an expected receive direction in addition to an expected transmit direction.

20. A method of wireless communication in an asymmetric antenna system (AAS) communication system, comprising:
a wireless station performing carrier sensing by sensing a wireless communication channel for ongoing communications in one or more directions;
upon detecting that the wireless communication channel is idle:
transmitting a frame preamble on the channel to a receiving wireless station in more than one transmit direction;
periodically transmitting a frame mid-amble in a minimum number of transmit directions which cover an expected receive direction; and
transmitting a frame payload on the channel to the receiving wireless station in one transmit direction.

21. The method of claim 20, wherein the minimum number of transmit directions cover the expected receive direction in addition to an expected transmit direction.

22. A wireless station for asymmetric antenna system (AAS) communication, comprising:
a transceiver that communicates over a wireless communication channel; and
a control module that senses a wireless communication channel via the transceiver for ongoing communications in one or more directions, and upon detecting that the wireless communication channel is idle, transmits via the transceiver a frame preamble on the channel to a receiving wireless station in more than one transmit direction, periodically transmits a frame mid-amble in a minimum number of transmit directions which cover an expected receive direction, and transmits a frame payload on the channel to the receiving wireless station in one transmit direction.

23. The wireless station of claim 22, wherein the minimum number of transmit directions cover the expected receive direction in addition to an expected transmit direction.

24. A method of wireless communication in an asymmetric antenna system (AAS) communication system, comprising:

carrier sensing, by a wireless station sensing a wireless communication channel for ongoing communications in one or more directions, wherein carrier sensing further comprises sensing the wireless communication channel in a minimum number of receive directions for covering a transmit direction;

upon detecting that the wireless communication channel is idle:

transmitting a frame preamble on the channel to a receiving wireless station in more than one transmit direction; and transmitting a frame payload on the channel to the receiving wireless station in one transmit direction, wherein transmitting the frame preamble further comprises periodically transmitting a frame mid-amble in a minimum number of transmit directions which cover an expected receive direction in addition to an expected transmit direction.

25. A wireless station for asymmetric antenna system (AAS) communication, comprising:

a transceiver that communicates over a wireless communication channel; and a control module that senses a wireless communication channel via the transceiver for ongoing communications in one or more directions, and upon detecting that the wireless communication channel is idle, transmits via the transceiver a frame preamble on the channel to a receiving wireless station in more than one transmit direction and transmits a frame payload on the channel to the receiving wireless station in one transmit direction, wherein the wireless channel is sensed in a minimum number of receive directions for covering a transmit direction, wherein the control module is further configured for periodically transmitting a frame mid-amble in a minimum number of transmit directions which cover an expected receive direction in addition to an expected transmit direction.

* * * * *